United States Patent
Park

(10) Patent No.: US 8,047,339 B2
(45) Date of Patent: Nov. 1, 2011

(54) CALIPER ATTACHING TYPE ELECTRICAL PARKING BRAKE IN VEHICLE

(75) Inventor: Inwook Park, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 534 days.

(21) Appl. No.: 12/203,349

(22) Filed: Sep. 3, 2008

(65) Prior Publication Data

US 2009/0308698 A1    Dec. 17, 2009

(30) Foreign Application Priority Data

Jun. 16, 2008    (KR) .................. 10-2008-0056306

(51) Int. Cl.
*F16D 55/14* (2006.01)
(52) U.S. Cl. .................. 188/72.8; 188/156; 188/158
(58) Field of Classification Search .................. 188/2 D, 188/72.7–72.9, 156–162; 303/7, 115.2
See application file for complete search history.

(56) References Cited

U.S. PATENT DOCUMENTS

| | | | |
|---|---|---|---|
| 6,279,691 B1 * | 8/2001 | Takahashi et al. | 188/72.8 |
| 6,394,235 B1 | 5/2002 | Poertzgen et al. | |
| 6,412,610 B1 * | 7/2002 | Drennen et al. | 188/156 |
| 6,431,330 B1 | 8/2002 | Poertzgen et al. | |
| 6,938,736 B2 * | 9/2005 | Takahashi | 188/72.1 |
| 7,021,415 B2 | 4/2006 | Farmer et al. | |
| 7,681,961 B2 * | 3/2010 | Nonaga et al. | 303/155 |
| 2003/0178264 A1 * | 9/2003 | Halasy-Wimmer et al. | 188/158 |
| 2004/0195058 A1 * | 10/2004 | Ina et al. | 188/158 |
| 2005/0225166 A1 * | 10/2005 | Greenberg et al. | 303/89 |
| 2006/0180413 A1 * | 8/2006 | Halasy-Wimmer et al. | 188/158 |
| 2007/0296269 A1 | 12/2007 | Jeon | |
| 2008/0121473 A1 | 5/2008 | Kang | |
| 2008/0135355 A1 | 6/2008 | Jeon | |

FOREIGN PATENT DOCUMENTS

KR    10-2007-0033627    3/2007

OTHER PUBLICATIONS

English language Abstract of KR 10-2007-0033627, Mar. 27, 2007.

* cited by examiner

*Primary Examiner* — Christopher Schwartz
(74) *Attorney, Agent, or Firm* — Greenblum & Bernstein P.L.C.

(57) ABSTRACT

According to an embodiment of the present invention, there is provided an EPB serving as an electrical parking brake in which a gear wheel and an external ring gear are arranged parallel to a driving gear rotating through a motor serving as the power source on a side surface, and fixed and output sun gears generating output torque are arranged to penetrate the external ring gear in a shaft direction via an internal ring gear and a planetary gear being in inner contact with the external ring gear, an overall length of a single body type housing with the motor is determined only by diameters of the driving gear, the gear wheel, and the external ring gear. Therefore, a power assembly converting the power of the motor driven by an ECU into the output torque is downsized so that a caliper mounted on a wheel presses a wheel disk.

5 Claims, 3 Drawing Sheets

US 8,047,339 B2

CALIPER ATTACHING TYPE ELECTRICAL PARKING BRAKE IN VEHICLE

CROSS-REFERENCE TO RELATED APPLICATIONS

The present application is based on, and claims priority from, Korean Application Serial Number 10-2008-0056306, filed on Jun. 16, 2008, the disclosure of which is hereby incorporated by reference herein in its entirety.

FIELD OF THE INVENTION

The present invention relates to a parking brake, and more particularly, to a caliper attaching type electrical parking brake in a vehicle.

BACKGROUND OF THE INVENTION

Generally, when it is intended to park a vehicle movement of the vehicle is restricted by actuating a parking brake.

As for such a parking brake, in general, an equalizer equally distributes force applied to parking cables pulled by a parking brake lever) to brakes mounted on wheels and thus the brakes restrict the wheels to prevent motion of the vehicle.

As described above, the parking brake was inconvenient for the drivers. Accordingly, an EPB (Electrical Parking Brake) generating parking clamping force through power of a motor by operating a button is adopted for improvement of convenience and product attractiveness.

Even though such an EPB has high installation flexibility for the vehicle, recently, the mountability of the EPB is further facilitated by adopting a method of integrating the EPB with a caliper serving as a braking device.

In a case when the EPB is integrated with the caliper, it is preferable that the EPB is formed in a compact size in which the size of the caliper to be mounted is increased by adopting a gear device for converting a final output into a large load while using a smaller motor.

However, even though the motor had to be downsized for such a characteristic, that is, overall downsizing of the EPB, the final output through gear transmission decreases in a case when the motor is small and thus clamping force (in general, 1,200 Kgf) for maintaining parking braking decreases, thereby lowering reliability for performance of the EPB.

The clamping force enough to maintain the parking braking is generated by increasing the power of the motor, the overall size of the EPB is increased due to the motor, thereby lowering the mountability.

As a result, it is focused on design of the gear device for converting the power of the motor so that the EPB having the sufficient final output and the compact size is designed even though the motor is downsized, but the gear device is constituted by a minimum configuration, for example, at least two-stage carrier, two-stage planetary gear, two sun gears, and a one input gear in order to achieve a gear ratio for forming a load serving sufficient clamping force. Therefore, a limit in miniaturization of the gear device may prevent the EPB from being mounted on the caliper due to a characteristic of the caliper mounted in a narrow space.

SUMMARY OF THE INVENTION

An embodiment of the present invention provides an electrical parking brake (EPB) capable of generating sufficient clamping force as final output torque through a gear ratio without increasing the power of a motor by increasing the number of teeth of a sun gear at a final output through providing an internal ring gear being in outer contact with a planetary gear on the same shaft and arranging two sun gears in the same shaft direction to convert the power of the motor transmitted via an idle gear.

Further, an embodiment of the present invention provides an EPB which is capable of implementing deceleration performance through a small number of gears by using a dual coaxial sun gear type gear generating parking clamping force which is final output torque as the power of the motor in comparison with using a general planetary gear, and improving mountability on a caliper by reducing an overall size of the EPB since a width and a train of the gear is decreased in comparison with a differential planetary gear.

A caliper attaching type electrical parking brake in a vehicle includes an EPB ECU, a power assembly, a linear movement unit, and a caliper. The EPB ECU controls driving of the vehicle and generates a control signal for implementing parking by receiving a signal of an operation button. The power assembly includes a decelerator including an external ring gear and an axial force generating gear. The external ring gear is, in parallel, in outer contact with a side surface of a gear wheel being, in parallel, in outer contact with a side surface of a driving gear directly receiving rotation force of a motor rotating in a forward or reverse direction depending on the control of the EPB ECU. The axial force generating gear is arranged to penetrate in a shaft direction in the inside of the external ring gear and generates axial direction power for pressing a pad toward a wheel disk, and a single body type housing having the motor and the decelerator therein. The linear movement unit has a screw shaft moving forward, backward, and linearly by receiving output torque generated in the power assembly. The caliper is installed to cover the wheel disk mounted on a wheel and implementing a parking braking state of the vehicle as a piston presses the pad with shaft-direction pressing force applied by a screw shaft and a nut constituting the linear movement unit to restrict the wheel disk in driving the motor.

A diameter and the number of teeth of the gear wheel is larger and more than those of the driving gear and a diameter and the number of teeth of the external ring gear is larger and more than those of the gear wheel.

The axial force generating gear includes an internal ring gear, a planetary gear, a fixed sun gear, an output sun gear, and a thrust bearing. The internal ring gear is press-fit in the inside of the external ring gear. The planetary gear is in outer contact with the internal ring gear with being arranged in a shaft direction to penetrate the internal ring gear. The fixed sun gear has one end fixed to the single body type housing, which does not rotate while being in outer contact with the planetary gear. The output sun gear generates axial force which is the output torque toward the caliper while rotating in outer contact with the planetary gear. The thrust bearing is positioned at a front end of the planetary gear.

The single body type housing includes a motor housing having the motor with the driving gear removed; a gear housing extending parallel to the motor housing in a lengthwise direction of the motor housing on one side surface of the motor housing to house the decelerator constituted by the outer ring gear receiving the rotation force of the driving gear being in outer contact therewith via the gear wheel; and a housing cover covering the decelerator fit in the motor housing and the gear housing.

According to an embodiment of the present invention, it is possible to implement deceleration performance higher than a general planetary gear in order to generate final output torque which is clamping force through a gear ratio by increasing the number of teeth of a sun gear at a final output through providing an internal ring gear being in outer contact with a planetary gear on the same shaft and arranging two sun gears in the same shaft direction, and to implement a more compact EPB system capable of achieving reduction in weight and saving manufacturing cost by decreasing a width and a train of a gear and reducing the number of gears in comparison with a differential planetary gear by using a dual coaxial sun gear type gear converting the power of a motor into the final output torque in actuating an EPB which is an electrical parking brake.

BRIEF DESCRIPTION OF THE DRAWINGS

For a better understanding of the nature and objects of the present invention, reference should be made to the following detailed description with the accompanying drawings, in which.

DETAILED DESCRIPTION OF PREFERRED EMBODIMENTS

Hereinafter, an embodiment of the present invention will be described in detail with reference to the accompanying drawings, in which the embodiment of the invention is shown. The present invention may be embodied in various forms by those skilled in the art and should not be construed as limited to the embodiment set forth herein.

Figure 1:
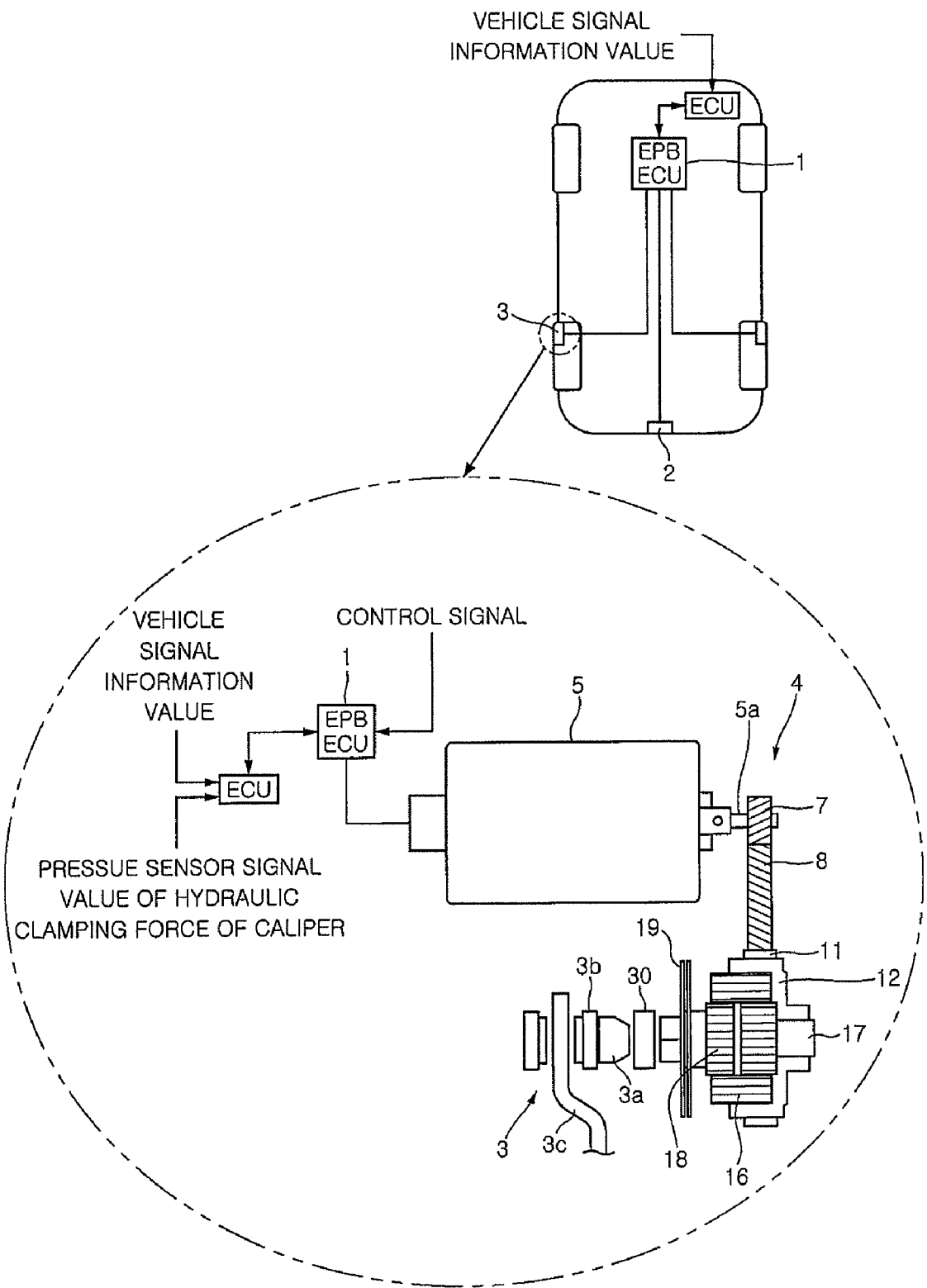
FIG. 1 is a block diagram of a caliper attaching type electrical parking brake according to an embodiment of the present invention.

FIG. 1 is a block diagram of a caliper attaching type electrical parking brake according to an embodiment of the present invention. An EPB (Electrical Parking Brake) which is an electrical parking brake according to an embodiment of the present invention includes an EPB ECU 1 that controls driving of a vehicle and generate a control signal for parking by receiving a signal of an operation button 2, a power assembly 4 generating clamping force of a wheel disk 3c by transmitting of the power of a motor 5 driven by receiving the control signal of EPB ECU 1 to a decelerator, a linear movement unit 30 linearly moving for an advance or retreat by receiving output torque of power assembly 4, and a caliper 3 installed to surround wheel disk 3c mounted on a wheel and implementing a parking braking state by restricting the wheel in actuating motor 5.

Caliper 3 includes a piston 3a moving by receiving force, a pair of pads 3b pressed with moving to wheel disk 3c through movement of piston 3a, and a caliper housing having an overall shape by coupling piston 3a with pads 3b. Such a configuration is the same as the operation of a general caliper type brake.

Power assembly 4 includes motor 5 generating rotation power according to the control of ECU 1, a decelerator generating power for pressing pads 3b toward wheel disk 3 while rotating with receiving the rotation force of motor 5, and a single body type housing mounted on caliper 3 and having motor 5 and the decelerator therein.

As motor 5, various kinds of motors may be used and a DC motor is preferably used.

Figure 2:
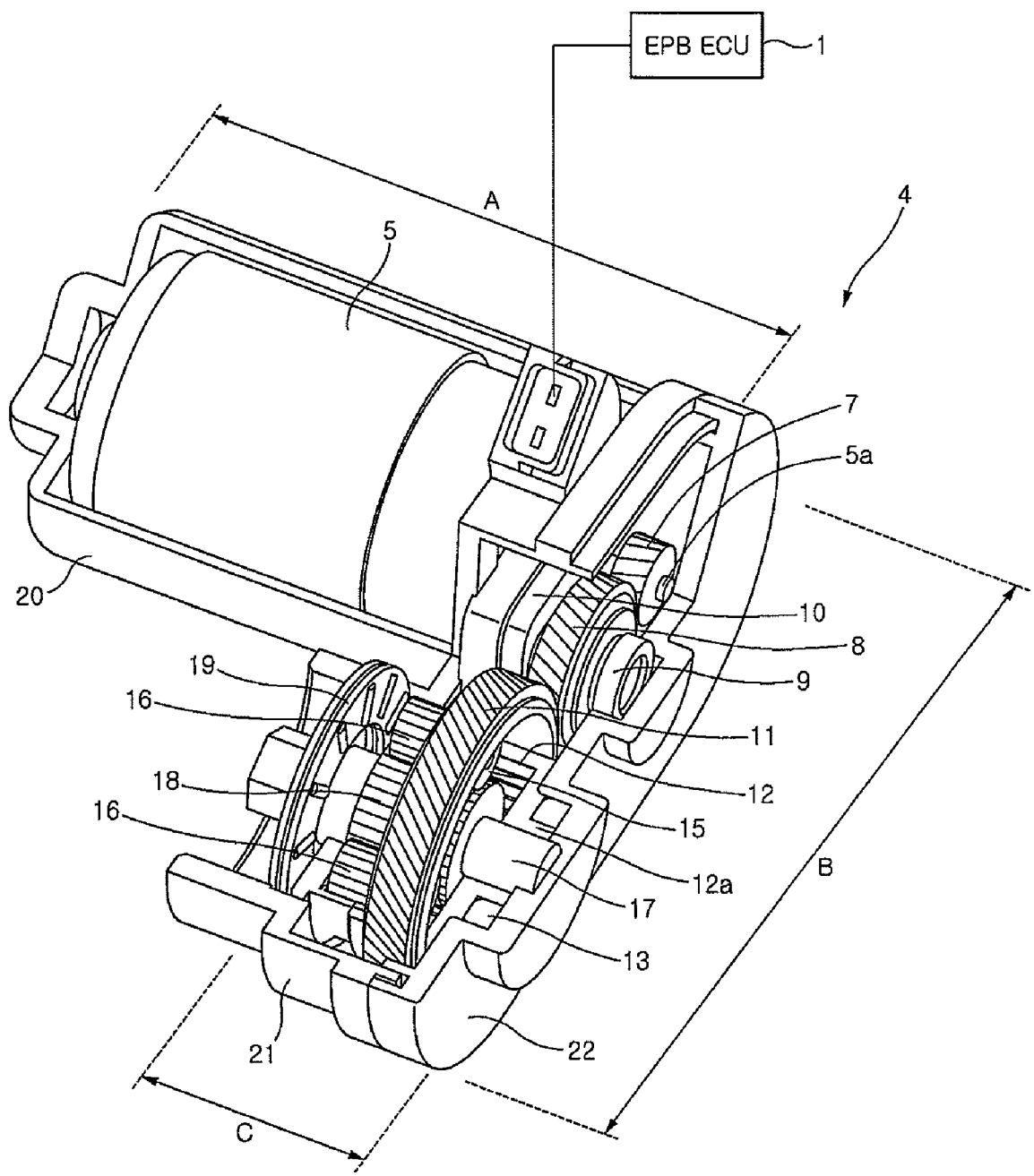
FIG. 2 is a perspective view of a power assembly mounted on a caliper and generating clamping force according to an embodiment of the present invention.

As shown in FIG. 2, the decelerator includes a driving gear 7 rotating while being coupled to a motor shaft 5a of motor 5 to directly receive the rotation force of motor 5, a gear wheel 8 positioned on a side surface of driving gear 7 and reducing the rotation speed of driving gear 7, and an axial force generating gear positioned on a side surface of gear wheel 8 and generating axial force to press a portion of piston 3a pushing pads 3b while reducing the rotation speed of gear wheel 8.

Motor shaft 5a of motor 5 is drawn from motor 5 and is coupled with driving gear 7, and is supported by a motor bracket 6. Motor bracket 6 is coupled to the single body type housing while surrounding motor shaft 5a. Both sides of gear wheel 8 are supported by a support bearing 9 and a bearing bracket 10 which are coupled to the single body type housing.

The axial force generating gear (i.e., the axial force generating gear assembly) includes an internal ring gear 12 press-coupled to the inside of an external ring gear 11 (of the decelerator) that rotatably engages the gear wheel 8 and a planetary gear 16 formed in the inside of internal ring gear 12 to generate the axial force. A thrust bearing 19 coupled to the single body type housing is provided at a front end of planetary gear 16.

For this, internal ring gear 12 includes an internal gear formed an inner surface thereof and a hollow type ring gear boss 12a formed on one side surface to support a shaft portion constituting planetary gear 16.

In a state where planetary gear 16 is arranged to rotating with engaging with the internal gear formed on the inner surface of internal ring gear 12, one-side portion engages with a fixed sun gear 17 fixed to support rotation of planetary gear 16 and the other-side portion is constituted by an output sun gear 18 generating output torque by rotating with planetary gear 16.

Figure 3:
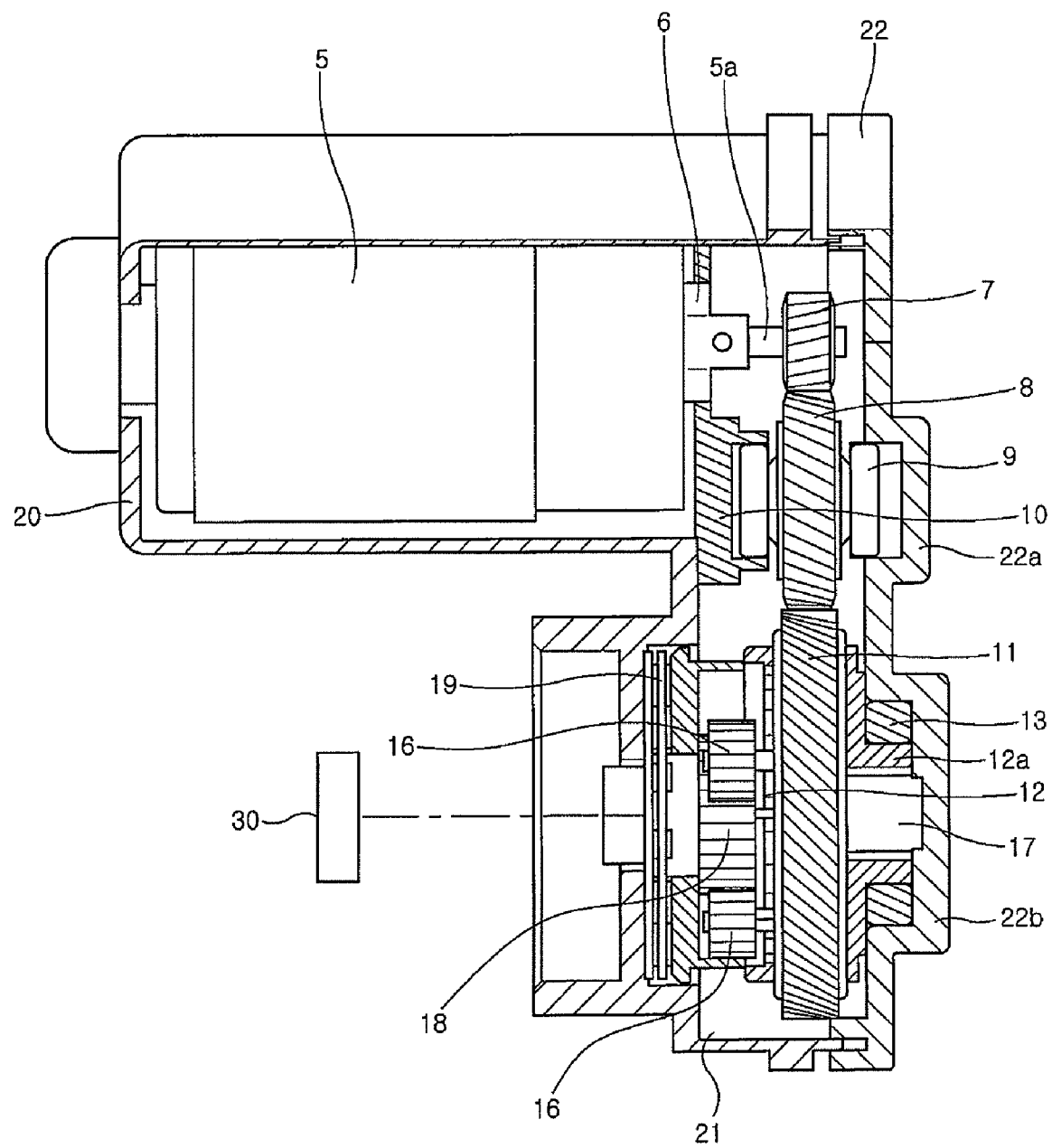
FIG. 3 is a block diagram of a power assembly mounted on a caliper and generating clamping force according to an embodiment of the present invention.

That is, fixed sun gear 17 has one end of fixed the single body type housing to enable planetary gear 16 to rotate as shown in FIG. 3, while output sun gear 18 rotates with planetary gear 16 in internal contact with planetary gear 16 to generate the output torque.

The number of teeth of output sun gear 18 is formed to be different from that of fixed sun gear 17 by one to three.

A gear train constituting the axial force generating gear, that is, an array in which driving gear 7 rotating through motor 5 engages with external ring gear 11 rotating via gear wheel 8 in parallel with each other is formed, and fixed sun gear 17 and output sun gear 18 are arranged on the same line at a shaft center to penetrate internal ring gear 12 via planetary gear 16 in the inside of internal ring gear 12 press-fit in external ring gear 11, thereby sufficient output torque while reducing an overall size of the single body type housing with the constituent members, particularly, by approximately 6 mm or more in a lengthwise direction thereof.

A gear ratio of the gears constituting the axial force generating gear is determined by $(No/Np) \times \{[Nso(Nsi+Ni)]/Ni(Nso-Nsi)\}$.

Herein, Np, No, Ni, Nsi, and Nso represent the numbers of teeth of driving gear 7, external ring gear 11, internal ring gear 12, fixed sun gear 17, and output sun gear 18, respectively.

Linear movement unit 30 pushes piston 3a toward wheel disk 3c by receiving the rotation output torque of output sun gear 18. For this, a screw shaft moving forward or backward while rotating has one end screwed to a nut portion formed at a front end of output sun gear 18 and the other end connected to piston 3a. This is a general structure.

A motor housing 20 housing motor 5 with driving gear 7 coupled to motor shaft 5a removed from motor shaft 5a is formed in the single body type housing capable of reducing its own overall size in the lengthwise direction thereof by at least approximately 6 mm or more as shown in FIG. 2. A gear housing 21 housing the decelerator constituted by the gears constituting the axial generating gear with gear wheel 8 extends on one side portion of motor housing 20.

A housing cover 22 covering and supporting the housed gears is coupled to motor housing 20 and gear housing 21. A groove is formed on periphery of the housing cover 22 to facilitate the coupling with motor housing 20 and gear housing 21. Peripheries of motor housing 20 and gear housing 21 are fit in the periphery groove of housing cover 22, thereby coupling motor housing 22 to motor housing 20 and gear housing 21.

Housing cover 22 includes a first bearing supporter 22a protruding to house support bearing 9 supporting one portion of gear wheel 8 and a second bearing supporter 22b in which an end portion of fixed sun gear 17 penetrating protruding gear boss 12a of internal ring gear 12 is positioned and protruding to house a bearing, as shown in FIG. 3.

As shown in FIG. 2, an overall motor housing width A is determined by adding a width of motor housing 20 having the length of motor 5 to a width of housing cover 22 having bearing supporter 22a protruding to support the end portion of gear wheel 8 arranged to engage with driving gear 7 rotating through motor 5 in parallel with each other.

The motor housing width A is determined by adding the width of housing cover 22 to the width of motor housing 20. Gear wheel 8 receiving the rotation force of driving gear 7 rotating by motor 5 serving as a power source is parallel to external ring gear 11 on side surfaces thereof, whereby the motor housing width A decreases by a length acquired by adding a width of one driving gear 7 to the length of motor housing 20.

Gear housing 21 extends to motor housing 20 on the side surface of motor housing 20, whereby a gear width housing length C formed by gear housing 21 has no influence on the motor housing width A.

As gear housing 21 extends to the rear side on the side surface of motor housing 20 and fixed sun gear 17 and output sun gear 18 arranged to penetrate external ring gear 11 are positioned in a shaft direction of gear housing 21, the gear width housing length C is included in the motor housing width A.

A horizontal size of the single body type housing corresponds to the motor housing width A and a vertical size of the single body type housing corresponds to a gear train housing length B of housing cover 22. The gear train housing length B is determined only by diameters of driving gear 7, gear wheel 8, and external ring gear 11 which are in outer contact with each other. Fixed and output sun gears 17 and 18 configured to generate the output torque are arranged via internal ring gear 12 and planetary gear 16 being in inner contact with external ring gear 11 while being housed in gear housing 21.

In the EPB which is the electrical parking brake according to the embodiment of the present invention, gear wheel 8 and external ring gear 11 are arranged parallel to driving gear 7 rotating through motor 5 serving as the power source on the side surface, and fixed and output sun gears 17 and 18 generating the output torque are arranged to penetrate external ring gear 11 in the shaft direction via internal ring gear 12 and planetary gear 16 being in inner contact with external ring gear 11, the overall length of the single body type housing with motor 5 is determined only by the diameters of driving gear 7, gear wheel 8, and external ring gear 11 which are in outer contact with each other. Therefore, power assembly 4 converting the power of motor 5 driven by ECU 1 into the output torque is downsized, for example, by approximately 6 mm so that caliper 3 mounted on the wheel presses the wheel disk.

For this, as shown in FIG. 3, in power assembly 4, the decelerator generating the output torque pressing the wheel disk with caliper 3 by rotating through the power of motor 5 controlled by EPB ECU 1 is compactly arranged in the single body type housing.

That is, driving gear 7 constituting the decelerator and gear wheel 8 being in outer contact therewith are positioned in motor housing 20 of the single body type housing. External ring gear 11 being in outer contact with gear wheel 8, and fixed and output sun gears 17 and 18 generating the output torque are arranged via planetary gear 16 to penetrate the shaft center of external ring gear 11, thereby being housed in gear housing 21 extending to motor housing 20 on the side surface of motor housing 20.

The overall length of the single body type housing may be determined only by the gear train housing length B acquired by the widths of motor housing 20 and gear housing 21. Therefore, it is possible to more efficiently implement the performance of the decelerator and reduce the overall size of the single body type housing smaller than the housing without the decelerator by approximately 6 mm.

As shown in FIG. 1, in the EPB which is the electrical parking brake, when a signal of the operation button is inputted into EPB ECU 1, driving gear 7 coupled to motor shaft 5a is rotated by the rotation force of motor 5 driven by EPB ECU 1.

It is assumed that motor 5 rotates in a forward direction when a parking state is maintained and motor 5 rotates in a reverse direction when parking braking force is released in activating the EPB which is the electrical parking brake. The reverse rotation of motor 5 is operated in a direction reverse to the forward rotation of motor 5. Therefore, generation of the parking braking force of motor 5, which is the forward rotation will be described.

As described above, after the rotation of driving gear 7 according to the forward rotation of motor 5 is transmitted to gear wheel 8 in parallel contact with therewith, external ring gear 11 being in outer contact with gear wheel 8 in parallel. At this time, as the rotation force generated in motor 5 is transmitted to driving gear 7, gear wheel 8, and external ring gear 11 of which diameters are gradually larger, the rotation speed decreases while torque increases.

Subsequently, in case of the rotation of external ring gear 11, as planetary gear 16 being in inner contact with internal ring gear 12 press-fit in external ring gear 11 rotates with internal ring gear 12, output sun gear 18 engaging with planetary gear 16 also rotates altogether.

One end of fixed sun gear 17 is fixed to cover housing 22, whereby fixed sun gear 17 does not rotate to operate to allow planetary gear 16 to rotate, but output sun gear 18 rotates to operate on finally generated shaft-direction torque, that is, output torque actuating caliper 3.

The rotation of output sun gear 18 moves linear movement unit 30 screw-coupled to a nut integrally formed at a front end of output sun gear 18, that is, rotates a screw shaft of linear movement unit 30 screw-coupled to the nut by the rotation of output sun gear 18. The rotation of the screw shaft allows the nut coupled to the end of the screw shaft to be removed to piston 3a, thereby pushing piston 3a with shaft-direction pressing force.

The movement of piston 3a presses pads 3b toward wheel disk 3c, whereby wheel disk 3c is restricted by pads 3b.

The output torque of the decelerator generating the parking braking force is designed by the gear ratios of the gears constituting the decelerator. That is, the output torque of output sun gear 18 required to maintain the parking braking force is designed by a relationship such as (No/Np)×{[Nso(Nsi+Ni)]/Ni(Nso−Nsi)}. This relationship is determined according to the parking braking force applied each vehicle type.

Herein, Np, No, Ni, Nsi, and Nso represent the numbers of teeth of driving gear 7, external ring gear 11, internal ring gear 12, fixed sun gear 17, and output sun gear 18, respectively.

What is claimed is:

1. A caliper attaching type electrical parking brake in a vehicle, comprising:
   a main housing that contains a motor and power assembly;
   an electronic parking brake control unit that controls driving of the vehicle and generates a control signal for implementing parking by receiving a signal of an operation button;
   the motor being driven by a control signal of the electronic parking brake control unit;
   the power assembly comprising:
      a decelerator having a driving gear, a gear wheel, and a external ring gear,
      the external ring gear having a rotational axis that is parallel to a rotational axis of the gear wheel and a side surface that contacts a side surface of the gear wheel, the rotational axis of the gear wheel being parallel to a rotational axis of the driving gear and the side surface of the gear wheel contacts a side surface of the driving gear, and the driving gear receiving a rotation force of a motor rotating in a forward or reverse direction depending on a control of the electronic parking brake control unit, and
      an axial force generating gear assembly is arranged inside the external ring gear to penetrate the external ring gear in the rotational axis direction of the external ring gear, the axial force generating gear assembly including:
         an internal ring gear press-fit in the inside of the external ring gear, a planetary gear contacting an outer portion of the internal ring gear and arranged to penetrate the internal ring gear in a rotational axis direction of the internal ring gear, a fixed sun gear having one end fixed to the main housing so as not to rotate while contacting an outer portion of the planetary gear, an output sun gear generating output torque by rotating with the planetary gear, and a thrust bearing positioned at a front end of the planetary gear;
   the axial force generating gear assembly generating power in an axial direction to presses to press a pad toward a wheel disk;
   a linear movement unit having a screw shaft configured to move forward, backward, and linearly by receiving the output torque generated by the sun gear; and
   a caliper installed to cover the wheel disk mounted on a wheel and implementing a parking braking state of the vehicle as a piston presses the pad with a shaft-direction pressing force applied by the screw shaft and a nut of the linear movement unit to restrict the wheel disk.

2. The brake as defined in claim 1, wherein a number of teeth of the output sun gear is more than a number of teeth of the fixed sun gear.

3. The brake as defined in claim 2, wherein the number of teeth of the output sun gear is one to three more than the number of teeth of the fixed sun gear.

4. The brake in accordance with claim 1, wherein a diameter of the gear wheel is lager than a diameter of the driving gear, a number of teeth of the gear wheel is more than a number of teeth of the driving gear, and a diameter of the external gear is larger than the diameter of the gear wheel and a number of teeth of the external ring gear is more than the number of teeth of the gear wheel.

5. The brake as defined in claim 1, wherein the main housing is a single body type housing comprising:
   a motor housing having the motor with the driving gear removed; and
   a gear housing extending parallel to the motor housing in a lengthwise direction of the motor housing on one side surface of the motor housing to house the power assembly; and
   a housing cover covering the decelerator fit in the motor housing and the gear housing.

* * * * *